April 22, 1969      M. L. BENJAMIN ET AL      3,439,458
INDEXING FIXTURE
Filed May 19, 1966      Sheet 1 of 3
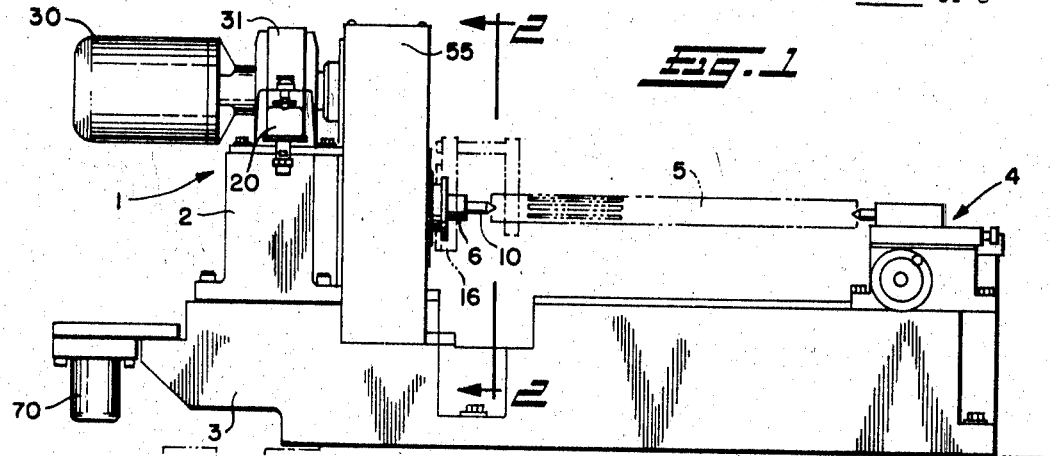
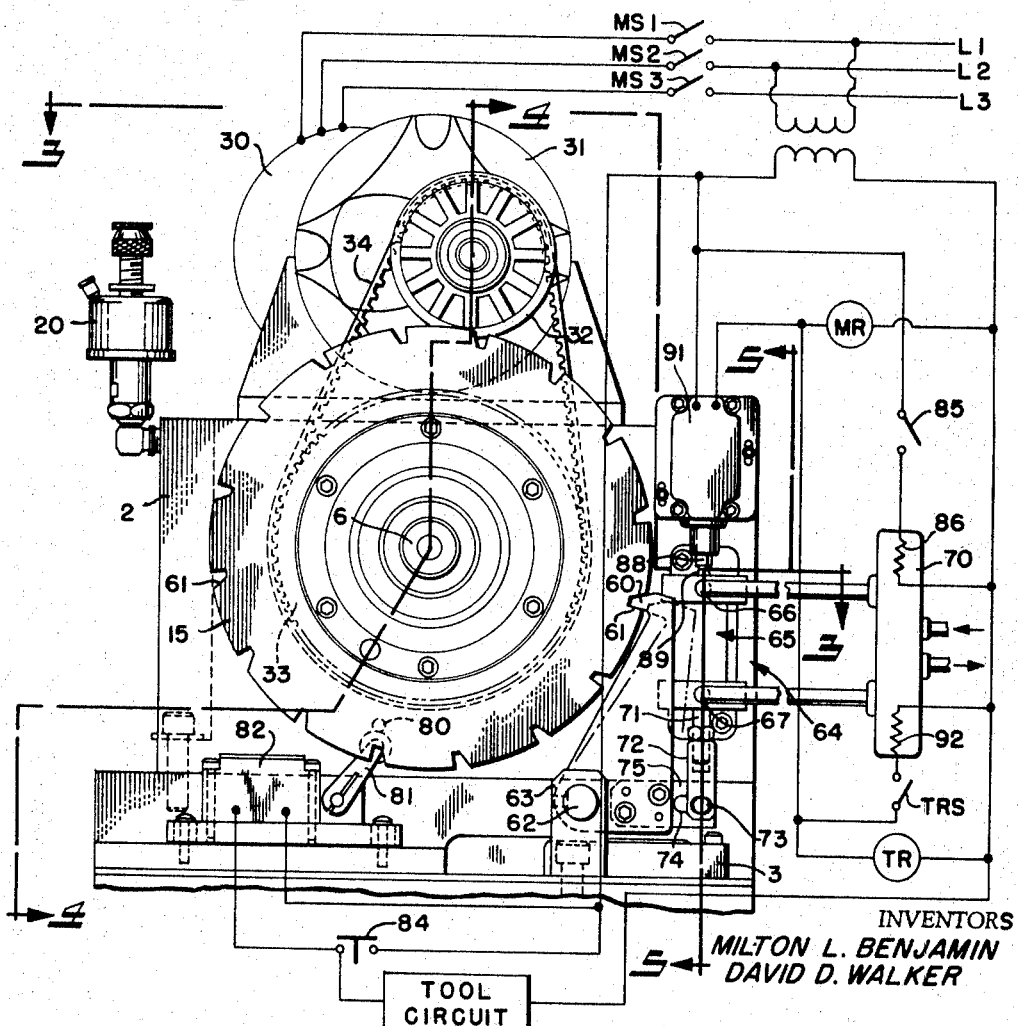
INVENTORS
MILTON L. BENJAMIN
DAVID D. WALKER
BY Oberlin, Maky & Donnelly
ATTORNEYS

INVENTORS
MILTON L. BENJAMIN
DAVID D. WALKER

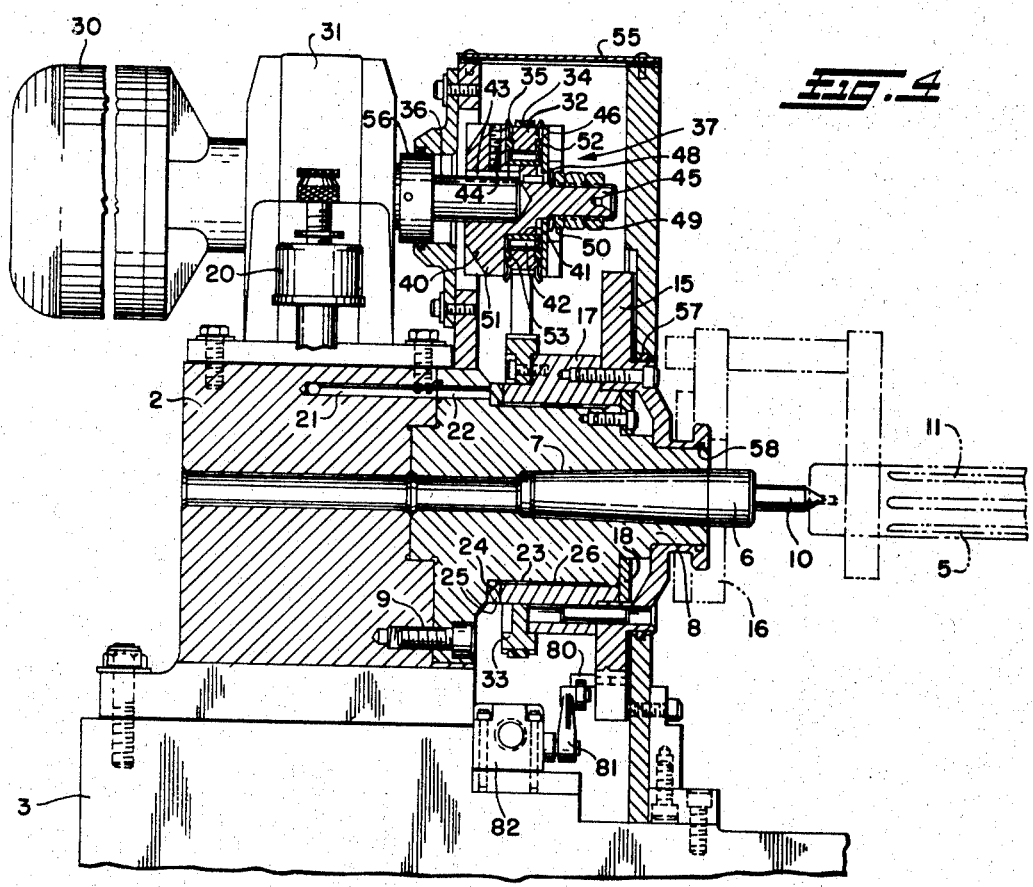

United States Patent Office 3,439,458
Patented Apr. 22, 1969

3,439,458
INDEXING FIXTURE
Milton L. Benjamin and David D. Walker, Chagrin Falls, Ohio, assignors to Erickson Tool Company, Solon, Ohio, a corporation of Ohio
Filed May 19, 1966, Ser. No. 551,358
Int. Cl. B24b 41/06
U.S. Cl. 51—216                           9 Claims

ABSTRACT OF THE DISCLOSURE

An indexing fixture having a work engaging spindle fixed to the housing against rotation, and an index plate mounted for rotation about the spindle.

---

This invention relates generally, as indicated, to an indexing fixture and, more particularly, to certain improvements in indexing fixtures for accurately maintaining the axial position of a workpiece during both machining and indexing operations.

There are of course many different types of indexing fixtures presently available which are capable of intermittently rotating a workpiece with respect to a machine tool such as a grinder for grinding uniformly spaced splines or the like therein. However, in most cases the radial play in the bearing mount for the index plate is sufficient to permit undesirable deflection of the workpiece or possible run out of the machine tool during the machining operation.

Various types of indexing fixtures have been devised in an effort to eliminate or substantially reduce such deflection of the workpiece, but not with much success primarily because of their complexity and high cost of manufacture. Accordingly, there is a definite need for a relatively simple and inexpensive indexing fixture which substantially eliminates deflection of a workpiece during indexing and machining operations, this being a primary object of the present invention.

Another object is to provide such an indexing fixture with a fixed or "dead" spindle for maintaining the axial position of a workpiece during intermittent rotation about its own axis.

A further object is to provide such an indexing fixture with a unique drive mechanism for intermittently indexing the workpiece between machining operations and including novel means for locking the index plate of the fixture in each indexed position.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In such annexed drawing:

FIG. 1 is a side elevation view of a preferred form of indexing fixture constructed in accordance with this invention shown in combination with a conventional tail stock for holding an elongated shaft or similar type workpiece;

FIG. 2 is a front elevation view of such indexing fixture taken on the plane of the line 2—2 of FIG. 1 and including a schematic piping and wiring diagram of the control system therefor, the dust cover of the fixture having been removed to show more clearly the drive mechanism for the index plate;

FIG. 4 is a partial longitudinal section through the indexing fixture taken on the plane of the line 4—4 of FIG. 2.

Figure 3:
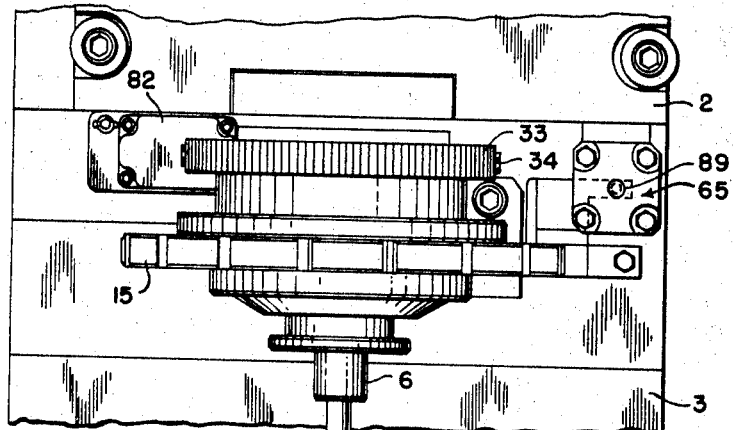
FIG. 3 is a partial top plan view of such indexing fixture as seen from the plane of the line 3—3 of FIG. 2 but with the clutch mechanism and drive therefor removed.
Figure 5:
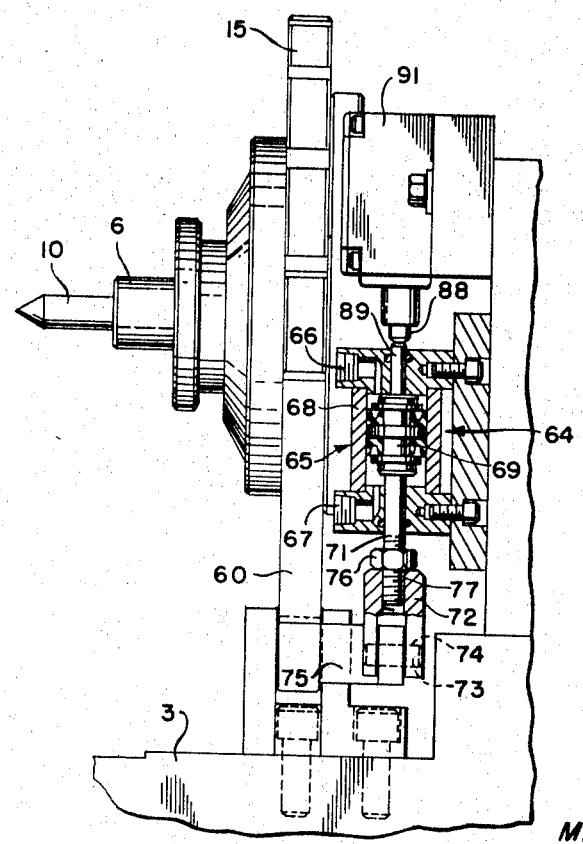
FIG. 5 is a side elevation view thereof with a portion of the detent actuating mechanism shown in section taken on the plane of the line 5—5 of FIG. 2.

Referring now in detail to the drawing and first especially to FIG. 1, a preferred form of indexing fixture in accordance with this invention is generally indicated at 1 and is shown with its housing 2 bolted or otherwise securely mounted adjacent one end of a bed frame 3. Also mounted on the bed frame 3 adjacent the other end thereof is a tail stock 4 of conventional type for supporting elongated bar stock 5 or the like between such tail stock 4 and indexing fixture 1.

As perhaps best seen in FIG. 4, the indexing fixture 1 includes a work engaging spindle 6 which is mounted against both rotation and radial movement in a tapered bore 7 of an adapter 8 fixed to the housing 2 as by means of suitable fasteners 9. Accordingly, with the spindle dog 10 engaging the bar stock 5 in line with its longitudinal axis, such longitudinal axis will remain stationary even though the bar stock may be rotatably indexed from one position to another or an external force applied thereagainst as by a grinder or other machine tool cutting circumferentially spaced longitudinal slots or splines 11 therein. This is quite advantageous over a conventional "live" spindle which rotates with the workpiece, since any radial play that might be present in the bearing for the "live" spindle is eliminated, as is any undesirable deflection of the workpiece or possible run out of the machine tool during the machining operation due to such radial play.

Indexing of the workpiece 5 may be accomplished by securing the same to an index plate 15 with the aid of a suitable mounting bracket 16 or the like, shown in phantom lines in FIG. 4. The index plate 15 is mounted on a sleeve bushing 17 rotatably received on the spindle adapter 8 and held in place by a retainer plate 18 attached to the spindle adapter 8 with its outer periphery overlying the outer end of the sleeve bushing 17. Lubricating oil for the sleeve bushing 17 may be supplied from a gravity feed oiler 20 mounted on the housing 2 through aligned passages 21 and 22 in the housing 2 and adapter 8 which communicate with a plurality of circumferentially spaced longitudinal grooves 23 in the outer surface of the adapter 8 via a frusto-conical bore 24 in a spacer ring 25 disposed between a shoulder on the adapter 8 and the sleeve bushing 17. An annular groove 26 through the longitudinal grooves 23 permits free circulation of the lubricating oil from one groove 23 to another.

The index plate 15 is driven by a suitable drive motor 30 through a gear reducer 31 which drives a timing belt pulley 32 connected to a similar pulley 33 on the sleeve bushing 17 as by means of a standard timing belt 34. The timing belt pulley 32 may have flared rings 35 attached to the end faces thereof to prevent the timing belt 34 from sliding off, and is mounted on the output shaft 36 of the gear reducer 31 by a suitable clutch mechanism 37, which in the preferred form shown herein includes a sleeve member 40 having a shoulder 41 on which the pulley 32 is rotatably mounted by a needle bearing 42 or the like. The sleeve member 40 is suitably keyed at 43 to the output shaft 36 and locked in place by a set screw 44, and has a reduced end portion 45 on which there is keyed a clutch plate 46 for axial movement toward and away from the pulley 32. Slidably disposed on the reduced end portion 45 outwardly of the clutch plate 46 there is a dished spring washer 48 with a pair of jam nuts 49 threaded on the reduced end portion 45 for applying a compressive force against the spring washer 48 through a thrust washer 50.

Upon tightening the jam nuts 49, a drive condition or frictional coupling of any desired magnitude may be established between the output shaft 36 and pulley 32 due to the frictional contact of the clutch plate 46 and flange 51 of the sleeve member 40 with the adjacent wear plates 52 and 53 on the end faces of the pulley 32. Accordingly, the rotation of the index plate 15 may be abruptly halted at an indexed position without overloading the drive motor 30 with consequent damage thereto, since the clutch mechanism 37 will permit relative rotational movement between the output shaft 36 and pulley 32 when the torque required to drive the index plate 15 exceeds the setting of the clutch mechanism 37.

A dust cover 55 may be disposed around the clutch mechanism 37 and outer surface of the index plate 15 with appropriately located wiper rings 56 and 57 between the adjacent surfaces of the dust cover, clutch mechanism, and index plate to keep out moisture and dirt particles. Moreover, similar wiper rings 58 may be disposed between the index plate 15 and spindle adapter 8.

The index plate 15 is locked in each indexed position by a holding pawl or detent 60 engaging one of a plurality of notches 61 in the outer periphery of the index plate 15, as clearly shown in FIG. 2. Although the number and spacing of the notches 61 may obviously be varied as desired depending upon the number and spacing of machining operations to be performed on a workpiece, sixteen of such notches, equally spaced, are illustrated. Withdrawal of the detent 60 from the notches 61 to permit indexing of the plate 15 from one position to another is effected by rotating the detent 60 away from the plate 15 about a pivot 62 on a bracket 63 fixed to the bed frame 3 through actuation of a detent actuating mechanism 64 operatively connected to the detent 60.

The detent actuating mechanism 64 consists of a piston-cylinder assembly 65 suitably attached to the indexing fixture housing 2 and provided with a pair of ports 66 and 67 located adjacent opposite ends of the cylinder 68 for raising and lowering of the piston 69 therein as determined by which port 66 or 67 is connected to fluid pressure through a suitable valve 70 and which is connected to exhaust. The piston rod 71 is connected to the detent 60 as by means of a yoke 72 having a pin 73 extending through an elongated slot 74 in a detent plate extension 75, whereby raising and lowering of the piston 69 and rod 71 will cause a corresponding inward and outward movement of the detent 60. The extent of detent 60 movement toward and away from the index plate 15 may be varied by loosening the lock nut 76 on the rod 71 and backing off or tightening the rod 71 in the threaded aperture 77 in the yoke 72, as desired.

Actuation of the valve 70 and drive motor 30 to withdraw the detent 60 from a notch 61 and advance the index plate 15 and thus the workpiece 5 from one angular position to another may be accomplished either manually or automatically. A schematic wiring diagram of a control system for effecting automatic detent withdrawal and indexing is illustrated in FIG. 2. With the index plate 15 in the position shown, the detent 60 is firmly held in a notch 61 by fluid pressure entering the lower port 67, and a striker pin 80 carried by the index plate 15 is in engagement with an arm 81 opening a cycle shut-off switch 82 mounted on the bed frame 3, whereby the tool circuit 83 for a grinder or similar tool is broken and the motor switches MS1, MS2, and MS3 are open.

For completing the tool circuit 83, there is provided a push button switch 84 which when closed causes the grinder to move through one complete cycle, cutting a first spline in the workpiece 5. As the grinder nears its original starting position, it closes a microswitch 85 for energizing a solenoid 86 which actuates the four-way valve 70 to permit flow of operating fluid to the upper port 66 of the piston-cylinder assembly 65 thereby causing downward movement of the piston 69 and cocking of the detent 60. During such downward movement of the piston 69, a plunger 88 which engages the piston extension 89 also moves downwardly, closing another microswitch 91 for supplying current to a motor relay MR which actuates the switches MS1, MS2, and MS3 for the drive motor 30. The microswitch 91 also supplies current to a timing relay TR which after a short delay closes a switch TRS for energizing a second valve solenoid 92, thus causing the valve 70 to move to a position supplying actuating fluid to the lower port 67 to raise the piston 69 and move the detent 60 inwardly. However, by this time the index plate 15 has been advanced somewhat by the drive motor 30, whereby the detent 60 is brought into engagement with the outer periphery of the index plate 15 where it is held until the next notch 61 is moved into alignment with the detent 60, at which time the detent 60 snaps into the notch. Now the index plate 15 is locked in position, but the motor 30 continues to apply torque to the index plate 15 through the clutch mechanism 37 until the piston extension 89 opens the microswitch 91 to de-energize the relay MR and open the motor switches MS1, MS2 and MS3. Then the grinder is caused to move through another complete cycle, grinding a second spline in the workpiece 5, after which the grinder again closes the microswitch 85 to index the workpiece. The fluid pressure supplied through the valve 70 maintains the detent 60 in tight engagement with the index plate 15 during the grinding operation to avoid possible shifting of the work due to the force applied by the grinder.

Once the striker pin 80 is moved beyond the arm 81, the cycle shut-off switch 82 closes, whereby the push button switch 84 may be released and current will still be supplied to the tool circuit 83 through the cycle shut-off switch 82. Accordingly, the grinding and indexing cycles will keep repeating themselves until the striker pin 80 makes a complete revolution and opens the cycle shut-off switch 82 through actuation of the arm 81.

Although the particular circuit just described intermittently actuates the drive motor 30 for the index plate 15, it should be understood that the motor 30 could be left on at all times during one full revolution of the index plate, since the clutch mechanism 37 will prevent burn-out or damage to the drive motor 30 while the index plate 15 is held in an indexed position.

Other modes of applying the principles of the invention may be employed, change being made as regards the details described, provided the features stated in any of the following claims or the equivalent of such be employed.

We therefore, particularly point out and distinctly claim as our invention:

1. An indexing fixture comprising a housing, a work engaging spindle, an adapter fixed to said housing for non-rotatably supporting said spindle against rotation, an index plate, and means mounting said index plate for rotation about said spindle, thereby permitting a workpiece to be connected to said index plate for rotation therewith while maintaining the axial position of such workpiece by engagement with said spindle, said last-mentioned means comprising a sleeve bushing rotatably received on said adapter, said index plate being directly attached to said sleeve bushing, and means including longitudinal grooves in the outer surface of said adapter for supplying lubricating fluid to said sleeve bushing.

2. An indexing fixture according to claim 1 wherein said last-mentioned means further includes a passage in said adapter, and a spacer ring disposed between a shoulder on said adapter and said sleeve bushing, said spacer ring having a frusto-conical bore therethrough communicating said passage in said adapter with said longitudinal grooves therein, and an annular groove through said longitudinal grooves for establishing free circulation of lubricating fluid from one longitudinal groove to another.

3. An indexing fixture comprising a housing, a work engaging spindle fixed to said housing against rotation, an index plate, means mounting said index plate for rotation about said spindle, thereby permitting a workpiece to be connected to said index plate for rotation therewith while maintaining the axial position of such workpiece by engagement with said spindle, drive means for rotating said index plate from one angular position to another, and a clutch mechanism interconnecting said index plate and drive means, said clutch mechanism including a sleeve member fixed to said drive means for rotation thereby, a first pulley, bearing means mounting said first pulley on said sleeve member for relative rotation, a clutch plate keyed to said sleeve member against relative rotation while permitting axial movement of such clutch plate toward and away from said first pulley, means for varying the frictional contact between said first pulley and clutch plate to establish a frictional coupling therebetween of varying magnitude, a second pulley carried by said index plate, and a drive belt interconnecting said first and second pulleys.

4. An indexing fixture comprising a housing, a work engaging spindle fixed to said housing against rotation, an index plate, means mounting said index plate for rotation about said spindle, thereby permitting a workpiece to be connected to said index plate for rotation therewith while maintaining the axial position of such workpiece by engagement with said spindle, drive means for rotating said index plate from one angular position to another, and a clutch mechanism interconnecting said index plate and drive means, said clutch mechanism including a sleeve member fixed to said drive means for rotation thereby, a first pulley, bearing means mounting said first pulley on said sleeve member for relative rotation, a clutch plate keyed to said sleeve member for axial movement toward and away from said first pulley, means for varying the frictional contact between said first pulley and clutch plate to establish a frictional coupling therebetween of varying magnitude, a second pulley carried by said index plate, and a drive belt interconnecting said first and second pulleys, said means for varying the frictional contact between said first pulley and clutch plate comprising a dished spring washer disposed on said sleeve member, and means for urging said spring washer toward said clutch plate.

5. An indexing fixture comprising a housing, a work engaging spindle fixed to said housing against rotation, an index plate, means mounting said index plate for rotation about said spindle, thereby permitting a workpiece to be connected to said index plate for rotation therewith while maintaining the axial position of such workpiece by engagement with said spindle, drive means for rotating said index plate from one angular position to another, and means for releasably locking said index plate in a plurality of different angular positions, comprising a plurality of angularly spaced notches in said index plate, a detent mounted for pivotal movement into and out of engagement with said notches, and a detent actuating mechanism for effecting such pivotal movements of said detent including a piston-cylinder assembly, a rod projecting from said piston, a lost-motion connection between said rod and detent, and means for driving said piston in one direction or the other to cause a corresponding inward or outward movement of said detent.

6. An indexing fixture according to claim 5 further comprising means for varying the effective length of said rod to vary the extent of movement of said detent toward and away from said index plate.

7. An indexing fixture according to claim 5 further comprising a solenoid operated valve for supplying the hydraulic fluid to effect such movements of said piston in one direction or the other, a first switch means which when actuated causes said valve to supply fluid for moving said piston in such other direction effecting disengagement of said index plate by said detent, motor switches which when closed actuate said drive means for rotating said index plate, a motor relay which when energized closes said motor switches, a timing relay which when energized after a short delay causes said valve to supply fluid for moving said piston in such one direction effecting engagement of said index plate by said detent, and a second switch means operative in response to such movement of said piston in such other direction to energize said motor relay and timing relay successively to actuate said drive means and then said detent toward said index plate, whereby said detent will engage the next notch in said index plate which is brought into alignment therewith for locking of said index plate in position.

8. An indexing fixture according to claim 5 further comprising a cycle shut-off switch which when opened de-energizes said motor relay and thus opens said motor switches to disrupt such rotation of said index plate, and a striker pin carried by said index plate for opening said cycle shut-off switch upon completion of each revolution of said index plate.

9. An indexing fixture comprising a housing, a work engaging spindle, an adapter fixed to said housing for non-rotatably supporting said spindle against rotation, an index plate, means mounting said index plate for rotation about said spindle, thereby permitting a workpiece to be connected to said index plate for rotation therewith while maintaining the axial position of such workpiece by engagement with said spindle, said means mounting said index plate for rotation about said spindle comprising a sleeve bushing rotatably received on said adapter, said index plate being carried by said sleeve bushing, means including longitudinal grooves in the outer surface of said adapter for supplying lubricating fluid to said sleeve bushing, drive means for rotating said index plate from one angular position to another, a clutch mechanism interconnecting said index plate and drive means, said clutch mechanism including a sleeve member fixed to said drive means for rotation thereby, a first pulley, bearing means mounting said first pulley on said sleeve member for relative rotation, a clutch plate keyed to said sleeve member for axial movement toward and away from said first pulley, a dished spring washer disposed on said sleeve member, means for urging said spring washer toward said clutch plate to establish a frictional coupling therebetween of varying magnitude, a second pulley carried by said index plate, and a drive belt interconnecting said first and second pulleys, and means for releasably locking said index plate in a plurality of different angular positions comprising a plurality of angularly spaced notches in said index plate, a detent mounted for pivotal movement into and out of engagement with said notches, and a detent actuating mechanism for effecting such pivotal movements of said detent including a piston-cylinder assembly, a rod projecting from said piston, a lost-motion connection between said rod and detent, and means for driving said piston in one direction or the other to cause a corresponding inward or outward movement of said detent.

References Cited
UNITED STATES PATENTS

| 1,956,983 | 5/1934 | DeVlieg | 51—216 X |
| 2,428,248 | 9/1947 | Strong | 51—216 X |
| 2,746,218 | 5/1956 | Bowie | 51—216 X |
| 2,296,731 | 9/1942 | Mustonen | 51—216 X |
| 2,292,588 | 8/1942 | Turbrueggen | 51—216 |

HAROLD D. WHITEHEAD, *Primary Examiner.*